June 14, 1960
M. F. MARX
2,941,139
CONSTANT OUTPUT CONTROL SYSTEM FOR AIRCRAFT AND THE LIKE
Filed Aug. 31, 1956
2 Sheets-Sheet 1
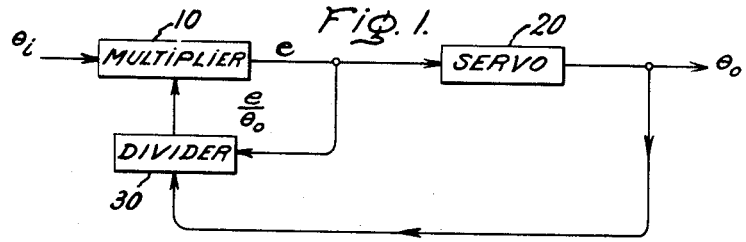
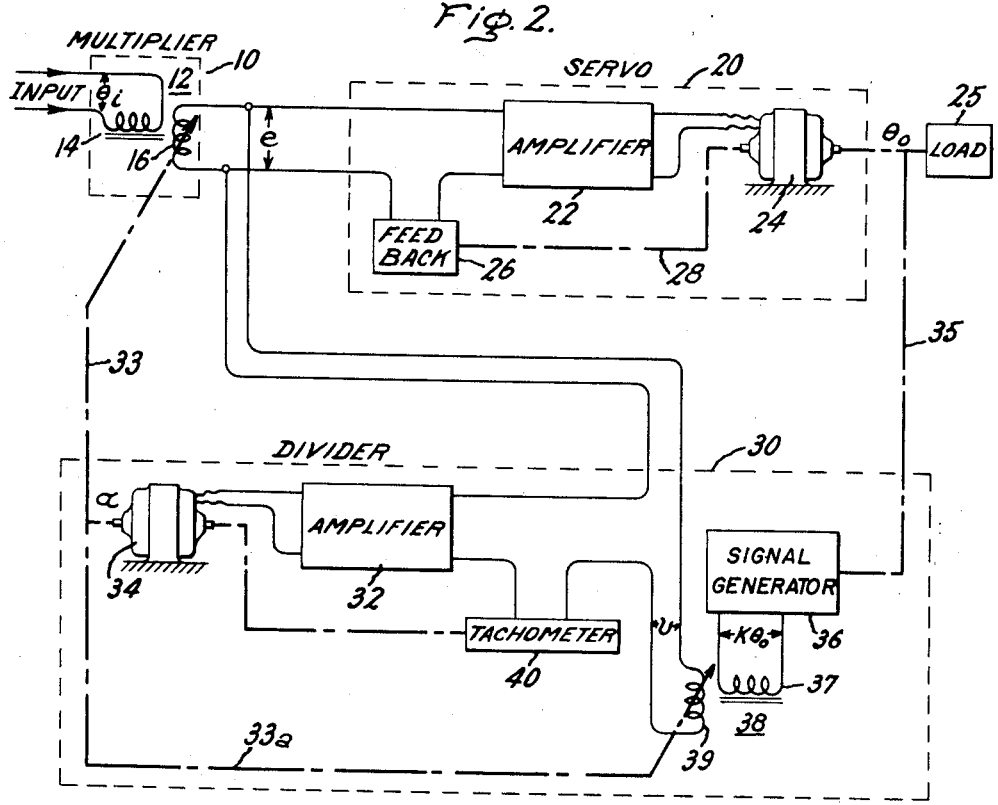
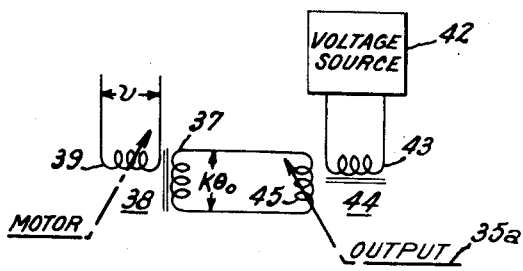
Inventor:
Michael F. Marx,
by Roe DMcBurnett
His Attorney.

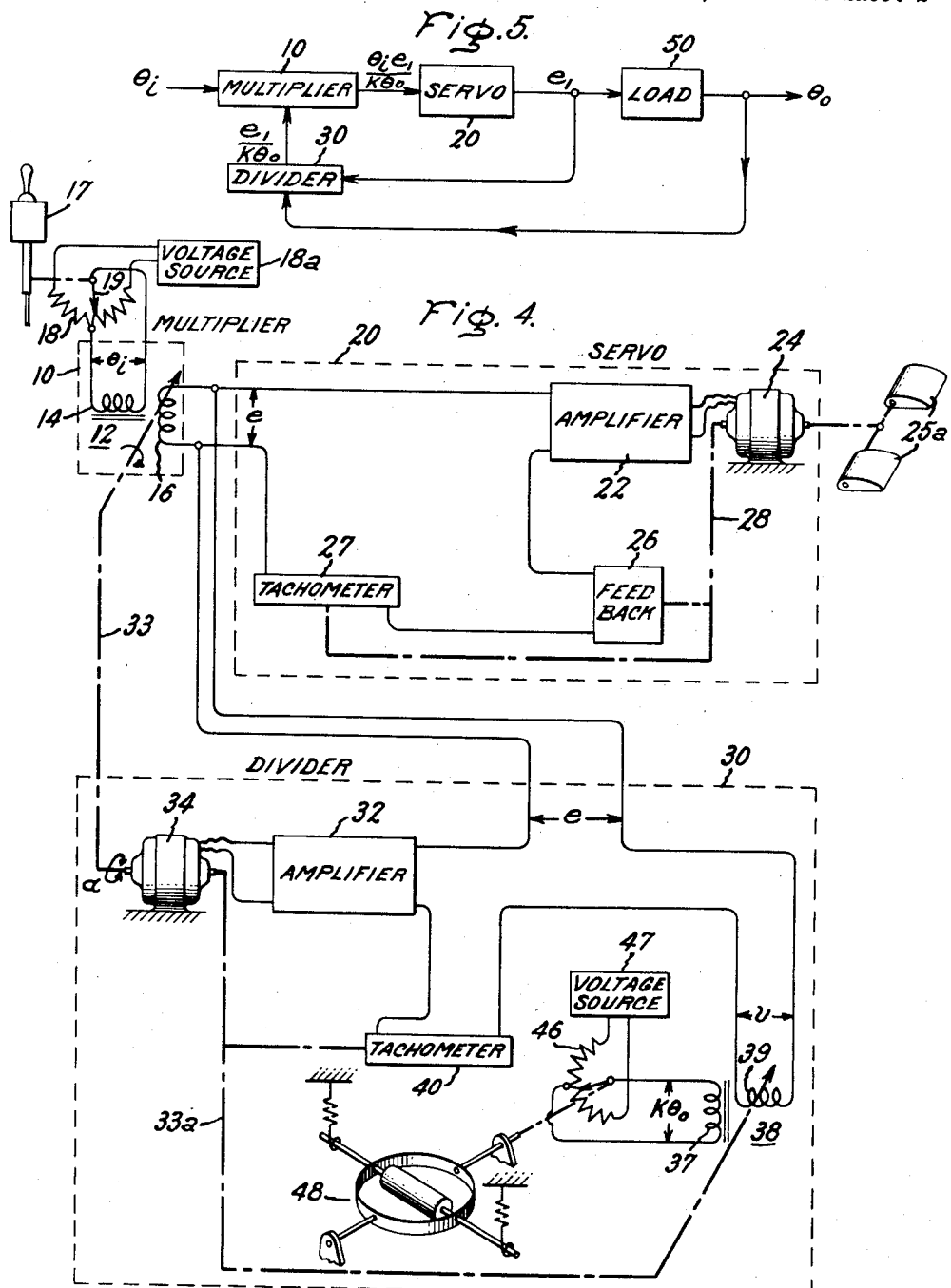

United States Patent Office 2,941,139
Patented June 14, 1960

2,941,139

CONSTANT OUTPUT CONTROL SYSTEM FOR AIRCRAFT AND THE LIKE

Michael F. Marx, Schenectady, N.Y., assignor to General Electric Company, a corporation of New York Filed Aug. 31, 1956, Ser. No. 607,336

15 Claims. (Cl. 318—446)

This invention relates to a constant output control system or regulator and more particularly to an electric control system for maintaining a constant output, such as speed, for a given manual input or control signal regardless of the varying operating or environmental load conditions of the device on which the control is used.

In present control systems or regulators it is necessary to vary the manual input signal to the control system according to the various operating or environmental load conditions of the device to be controlled in order to obtain a constant output, such as speed or angular position, from the device. Thus the operation of such devices, for example, machine tools or aircraft, requires a varying degree of skill on the part of the operator or pilot, dependent on the load conditions, such as hardness of metal or speed of the aircraft. However, were such devices provided with controls which would provide a constant output for a given input signal irrespective of the operating conditions, such devices could be used to obtain uniform results independent of the skills of the operator. Therefore, there presently exists a need for controls or regulators which can maintain a constant output for a given manual input under the various operating conditions which are associated with such controls.

Although it has many applications for control purposes, this invention is particularly useful in flight control systems for aircraft. Present flight control systems generally provide means whereby the human pilot can insert a manual control signal to the aircraft to perform a desired maneuver. Such a control system is illustrated and described in the copending application of Charles G. Yates, Jr., for "Aircraft Control Apparatus," Serial No. 256,167, filed November 14, 1951, now U.S. Patent No. 2,790,946, granted April 30, 1957, and assigned to the same assignee as the present invention. In such flight control systems, as are described in the copending Yates application heretofore mentioned, it is necessary for the human pilot, in order to obtain a desired maneuver of the aircraft, to vary the manual control signal in dependence upon a variety of conditions relating to the aircraft such as its altitude, weight, air speed, and the like. Thus, for the human pilot to perform a given maneuver of the aircraft, such as banking, he must correlate his control or command signal to the flight control system so as to compensate for the above-mentioned aircraft conditions. Therefore, the ability of the pilot to perform any given maneuver in modern high-speed aircraft depends to a great extent on the pilot's skill and his ability to judge the effect of the operating conditions of the aircraft on a desired maneuver. However, with the increased speed of modern aircraft there is little room for error on the part of the human pilot in performing such maneuvers since even a small error at such high speeds would greatly endanger the life of the human pilot as well as the lives of others who may be flying nearby or in formation with the pilot. Consequently, there is a great need in modern flight control systems to provide a control which would give a constant maneuver of the aircraft for a given manual command signal irrespective of the flight conditions such as altitude, weight and air speed.

Therefore, it is a principal object of this invention to provide a control system or regulator for maintaining a constant output for a given manual input without regard to the various load conditions or gradients associated therewith.

A further object of this invention is to provide a new and improved control or regulator for flight control systems which gives a constant aircraft maneuver for a given manual input or control signal to the system regardless of the aircraft flight conditions.

In carrying out the invention in one form the input or control signal is coupled to a servo, whose output it is desired to control, by means of a multiplier provided with a rotor winding. The output of the multiplier, which is the input to the servo, is also fed to a divider network where it is compared with a portion of a generated signal, proportional to the output of the servo. The resultant of these outputs is used to turn the rotor winding of the multiplier, thereby varying the portion of the input signal used to excite the servo. The divider output is also used to vary the compared portion of the generated signal. When the compared portion of the generated signal equals the output of the multipler, the output of the divider network is zero, and the servo has reached the desired output. Since this system does not depend on the varying operating or environmental load conditions, a constant output of the servo is obtained for a given input signal.

This invention will be better understood from the following description taken in connection with the accompanying drawings wherein:

Fig. 1 is a simplified schematic diagram in block form of a control system embodying one form of the invention;

Fig. 2 is a schematic diagram of a control system showing the invention in greater detail;

Fig. 3 is a schematic diagram showing an alternate form for connecting the servo output to the divider;

Fig. 4 is a schematic diagram showing the invention used in the elevator control channel of a flight control system; and Fig. 5 is a simplified schematic diagram in block form of a control system showing an alternate form of the invention.

Referring to the drawings wherein like numerals are used to indicate like parts throughout, and with particular reference to Fig. 1, this invention in one form comprises a block 10 representing an electric multiplier circuit which is used to connect the manual electric input or control signal $\theta_1$ to the electric servo, represented by block 20. In addition to supplying the excitation for the servo 20, the output $e$ of the multiplier 10 is also fed to a divider circuit, represented by block 30. Divider 30 is also energized or actuated by the output $\theta_0$ of the servo 20. The resultant of these two outputs $$\frac{e}{K\theta_o}$$

is fed to the multiplier 10 and determines the portion of the input or control signal $\theta_1$ which excites the servo 20. From the above it can be seen that $$e = \theta_1 \times \frac{e}{K\theta_o}$$

and $K\theta_o = \theta_1$, where K is a proportionality constant. Thus, the output of the servo always remains proportional to the input, regardless of the load on the servo. It is to be understood that the designations $\theta_1$ and $\theta_o$, for the input signal to the control system and the output of such system, respectively, may indicate an electrical voltage, a shaft rotation or a movement of the controlled device, and are used throughout to indicate any such input or output for convenience and uniformity.

Referring to Fig. 2 the multiplier 10 is shown in the form of a resolver 12 comprising two inductively associated windings, mounted respectively in a stator member and a rotor member in such manner that when one winding, for example the stator winding 14, is excited by an alternating voltage, a voltage is induced in the rotor winding 16 whose value is proportional to the angular position of the rotor winding 16 and varies as the sine of the angle through which the rotor winding 16 is turned. Resolver 12 has a stator winding 14 and a rotor winding 16 in inductive relation with the winding 14. An alternating input voltage $\theta_1$ excites the stator winding 14 which causes a voltage $e$ to be induced in the rotor winding 16. The voltage $e$ feeds the servo 20, which comprises a servo amplifier 22, a servo motor 24 and a feedback means 26. Voltage $e$ energizes the electric servo amplifier 22 which in turn energizes the servo motor 24 to produce the desired output $\theta_0$, which may be either speed or angular movement. The servo motor 24 has its shaft connected, in any suitable manner, such as gears (not shown), to drive a load 25, for example a machine tool, the load on which may vary with the hardness of the material to be machined or otherwise worked. Feedback means 26 is actuated by shaft 28 through suitable gearing (not shown) to provide the error signal to enable the servo to follow the input in a manner well known in the art. If desired, the feedback means 26 may be provided with a tachometer to prevent hunting of the motor 24, when angular movement is the desired output, as is well known in the art.

In addition to feeding the servo amplifier 22, the signal $e$ is also fed to the electric amplifier 32 of divider 30. The divider 30 is shown as comprising the amplifier 32, a motor 34, a generator 36, a resolver 38 and a tachometer 40, all connected in the manner hereinafter described. Amplifier 32 energizes an angular position motor 34, which is connected to rotor winding 16 by shaft 33, causing motor 34 to turn the rotor winding 16 of the resolver 12 through a suitable angle and in such a direction as to increase $e$. However, the output $\theta_0$ of the servo motor 24 drives an A.C. signal generator 36, through shaft 35 and suitable gearing (not shown), providing an output signal $K\theta_0$, proportional to $\theta_0$. The signal generator 36 excites the stator winding 37 of a resolver 38 causing a voltage $v$ to appear on its inductively associated rotor winding 39. The motor 34 also turns the rotor 39 through shaft 33a which determines the portion of the generated signal $K\theta_0$ which will energize the amplifier 32. The motor 34 will continue to turn rotor 16 and rotor 39 until the output of the amplifier 32 is zero. The output of amplifier 32 will be zero when $$\frac{e}{v}=1$$

that is when $e=v$, or stated another way, when $e-v=0$.

Since $v=K\theta_0 \sin \alpha$, where K is a proportionality constant and $\alpha$ is the angular position of the shaft of the motor 34, then $$e-K\theta_0 \sin \alpha=0$$

and $$e=\theta_1 \sin \alpha$$

therefore $$K\theta_0=\theta_1$$

Thus the output of the servo is always proportional to the input, regardless of its load conditions. The tachometer 40 may be included in the circuit to prevent hunting of the motor 34 in a manner well known in the art.

Fig. 3 shows a modification of a portion of the divider 30. Instead of the generator 36 a constant A.C. voltage source 42 may be provided which excites the stator winding 43 of a resolver 44. The excitation of stator winding 43 causes a voltage to appear on the inductively associated rotor winding 45 which in turn excites the stator winding 37 of the resolver 38. The magnitude of the voltage appearing on rotor 45 is determined by the angular output of the shaft of the servo motor 24 which is connected to turn the rotor 45 through shaft 35a.

Fig. 4 shows one form of the invention applied to the elevator control channel of an automatic pilot. Using the same numerals as were used in Fig. 2 to refer to like parts, the multiplier 10 is again shown in the form of a resolver 12, having a stator winding 14 and a rotor winding 16. A command signal from the human pilot is supplied to the control system by means of a manual actuator 17. This actuator is more fully described in the aforementioned copending Yates application. Briefly, the manual actuator 17 is operated to produce a signal from a potentiometer 18 which is connected across a voltage source 18a, by movement of the arm 19 in either direction from the center tap. Since the maneuver of the aircraft (not shown) will always be the same for a given command signal, the actuator 17 may be calibrated or provided with index means to show the correct position of the actuator 17 for the desired maneuver. The command or control voltage signal $\theta_1$, taken between the center tap of potentiometer 18 and arm 19, is applied to the resolver 12 and excites the stator winding 14, causing a voltage $e$ to appear on rotor winding 16. The servo 20 is again shown as comprising a servo amplifier 22, a servo motor 24 and a feedback means 26. Additionally, since an angular output is desired from the servo 20, a tachometer 27 is also employed. The voltage $e$ is fed to the servo amplifier 22, and the output of the servo amplifier 22 energizes the servo motor 24. The shaft of servo motor 24, which is connected to elevators 25a, turns and deflects the elevators 25a an angular amount proportional to the gradient of the elevator feedback 26 and in direction according to the polarity of command signal $\theta_1$. A tachometer 27 is also provided and is actuated by the servo motor 24 through shaft 28 to prevent hunting of the elevators in a manner well known in the art.

The output voltage $e$ of the resolver 12 is also fed to the amplifier 32 of the divider 30. Divider 30, as shown, comprises the amplifier 32, motor 34, a resolver 38 and a tachometer 40, as in Figure 2. However, since the desired output of this embodiment is aircraft motion, a pitch gyro 48 is used, instead of the generator 36, to provide energization of stator 37 of resolver 38. Amplifier 32 energizes motor 34 causing it to turn the rotor 16 of resolver 12 through shaft 33 so as to increase the voltage $e$. As the elevators 25a are deflected by the servo motor 24 a motion is impressed on the aircraft. This motion is sensed by the pitch rate gyro 48 which operates the potentiometer 46 which is connected across voltage source 47 in a manner well known in the art to produce a voltage $K\theta_0$ which is proportional to the output or reaction $\theta_0$ of the aircraft to the deflection of elevators 25a. Voltage $K\theta_0$ excites the stator 37 of resolver 38 and causes a voltage $v$ to appear on the rotor 39. The rotor 39 is turned by the motor 34 through shaft 33a which determines the portion of the gyro signal $K\theta_0$ that energizes the amplifier 32. A tachometer 40 may be provided in the divider circuit to prevent hunting of the motor 34. The motor 34 will continue to turn, and thus continue to move the rotor windings 16 and 39 until the output of amplifier 32 is zero. This will occur when $e=v$, that is, when $e-v=0$. Since $v=K\theta_0 \sin \alpha$, where $\alpha$ is the position of the shaft of motor 34; then $$e-K\theta_0 \sin \alpha=0$$

and $$e=\theta_1 \sin \alpha$$

Therefore, $K\theta_0=\theta_1$ or the output or reaction $\theta_0$ of the aircraft is proportional to the input commanded $\theta_1$.

To illustrate the operation of the system shown in Fig. 4, assume that the human pilot wishes to cause the aircraft to maneuver at a desired pitch rate. The human pilot manually positions the actuator 17 which moves the arm 19 over the potentiometer 18 to provide a signal $\theta_1$ of proper polarity and magnitude to obtain the desired pitch rate. This signal excites the stator winding 14 of resolver 12, causing a proportional signal $e$ to be induced in rotor winding 16. The signal $e$ from rotor winding 16 is fed to the servo amplifier 22, and the output of servo amplifier 22 energizes servo motor 24 causing servo motor 24 to turn in such a manner as to move the elevators 25a up or down according to the polarity of the command signal, and cause the aircraft to pitch. As servo motor 24 turns, the feed-back or follow-up means 26 is actuated by shaft 28 to produce a signal proportional to the displacement of the elevators 25a and in opposition to the signal $e$. At the same time the servo motor also operates the tachometer 27 through shaft 28, generating a signal proportional to the rate of change of position of the elevators 25a and also in opposition to the signal $e$. The servo motor 24 continues to turn until the signal from the feedback 26 cancels out $e$ and the tachometer signal is zero, which places the elevators 25a in the proper position to provide the desired pitch rate.

However, the signal $e$ is also fed to the amplifier 32, and the output of amplifier 32 energizes motor 34, causing it to turn and rotate rotor winding 16 through shaft 33 in such a direction as to increase $e$. As motor 34 turns it generates a signal in tachometer 40 proportional to the rate of change of position of the shaft of the motor 34. The signal from tachometer 40 is in opposition to signal $e$ and is provided to prevent hunting of the motor 34. The displacement of the elevators 25a produces a movement of the aircraft which is sensed by pitch rate gyro 48. The pitch rate gyro 48 produces a signal on potentiometer 46 which excites the stator winding 37 of resolver 38. Excitation of stator winding 37 induces a proportional signal $v$ on the rotor winding 39 in opposition to signal $e$. The rotor winding 39 of resolver 38 is also turned by motor 34 by shaft 33a in such a direction as to increase $v$. The motor 34 continues to turn until the signals $e$ and $v$ are equal and the signal from the tachometer 40 is zero. At this point signal $e$ is no longer increasing, the signal from the feedback 26 is exactly equal to $e$ and the signal from tachometer 27 is zero. Therefore, the elevators 25a continue to move in response to the human pilot's command signal until the output of the divider network is zero. At this point the aircraft is pitching at the desired rate, indicated by the command signal. Of course, to restore zero pitch rate the human pilot merely has to return the actuator 17 to zero signal position.

In the particular example illustrated, the invention is described as applied to the elevator control channel. However, it is obvious that it can be readily applied to any other control channel of the aircraft or with equal facility could be utilized to control any output of the aircraft, such as acceleration.

By the use of this invention the entire flight control problem is considerably simplified since the gain of the aircraft can be considered to be constant regardless of flight conditions. Thus a given command signal to the flight control system incorporating this invention will provide the same maneuver of the aircraft under all flight conditions. Therefore, there is no need for the human pilot to vary his command signal to the system when a desired maneuver is to be executed, to correct for changes in flight conditions, such as changes in aircraft weight, air speed and the like.

Fig. 5 is a block diagram of a modified form of the invention. In this form of the invention block 10 represents a multiplier into which is fed the input signal $\theta_1$. The output of multiplier 10 feeds a servo 20 which in turn actuates a load 50. Servo output $e_1$ is also fed to the divider 30. Load 50 has an output $\theta_0$ and this output is used to actuate or energize the divider 30. Thus the output of divider 30 is $$\frac{e_1}{K\theta_0}$$

and this output is fed into the multiplier 10. From this it can be seen that $$e_1 = \frac{\theta_1 e_1}{K_1 \theta_0}$$

and $K\theta_0=\theta_1$ where $K$ is a proportionality constant. Therefore, the output of the load is always proportional to the input. Obviously, the modification shown in Fig. 5 can be readily applied to the form of the invention as shown in Fig. 2 and Fig. 4, if desired Of course, it is obvious that other modifications can be made in the circuits shown and described as well as various substitutions for the components described. For example, the various resolvers described could be replaced by potentiometers, sine cards, or by selsyns, if desired. While the various voltages described have been indicated as A.C. voltages it is obvious that either A.C. or D.C. voltages could be used as desired by utilizing proper components anywhere in the system.

Therefore, while in accordance with the patent statutes there has been shown and described the preferred embodiments of the invention, it will be obvious to those skilled in the art that various changes or substitutions may be made without departing from the spirit and scope of the invention defined in the appended claims.

What is claimed as new and which is desired to secure by Letters Patent is:

1. A constant output control system comprising a multiplier for coupling an input signal to a motor, means for feeding the output of said multiplier to a divider, means for feeding the output of said motor to said divider, and means for feeding the resultant output of said divider to said multiplier, whereby, when the output of said divider is zero the output of said motor is constant for said input signal.

2. In a system for controlling the output of a motor, an input signal, a multiplier, means for feeding said input signal to said multiplier, means for feeding the output of said multiplier to a motor, a divider, means for feeding the output of said multiplier to said divider, means for feeding the output of said motor to said divider, and means for feeding the output of said divider to said multiplier, whereby when the output of said divider is zero, the output of said motor is constant for said input signal.

3. A control system comprising a multiplier, means for feeding a control signal to said multiplier, means for feeding the output of said multiplier to a servo, means for feeding the output of said servo to a device to be controlled, means for feeding the output of said multiplier to a divider, means for feeding the output of said device to be controlled to said divider, and means for feeding the resultant output of said divider to said multiplier, whereby said device to be controlled has a constant output for said control signal when said divider output is zero.

4. A control system comprising a multiplier for coupling a control signal to a device to be controlled, means for feeding the input signal of said device to be controlled to a divider, means for feeding the output of said device to be controlled to said divider, and means for feeding the output of said divider to said multiplier, whereby the output of said device to be controlled is always proportional to said control signal when said divider output is zero.

5. In a control system, a multiplier, means for feeding a control signal to said multiplier, a servo, means for feeding the output of said multiplier to said servo, means for feeding the output of said servo to a load, means for feeding the output of said multiplier to a divider, means for feeding the output of said servo to said divider, and means for feeding the output of said divider to said multiplier, until the output of said divider is zero.

6. In a flight control system a multiplier, means for feeding a control signal to said multiplier, a servo, means for feeding the output of said multiplier to said servo, said servo connected to move a control surface, a divider, means for feeding the output of said multiplier to said divider, means in said divider for generating a signal in response to the movement of said control surface in opposition to said multiplier output, and means for feeding the output of said divider to said multiplier, whereby, when the output of said divider is zero, the movement of said control surface is proportional to said control signal.

7. In a flight control system, a resolver having a stator winding and a rotor winding, means for feeding a command signal to said stator winding whereby a proportional signal is induced in said rotor winding, a servo, means for feeding the output of said rotor winding to said servo, a control surface moved by said servo, an amplifier, means for feeding the output of said rotor winding to said amplifier, means for generating a signal in response to the action of said control surface, means for feeding said generated signal to said amplifier in opposition to the output of said rotor winding to produce a resultant voltage, a motor energized by the resultant voltage of said amplifier, means connecting said motor to said rotor winding whereby said rotor winding is turned to vary the input to said servo to provide a predetermined movement of said control surface for said command signal and reduce said resultant voltage to zero.

8. A flight control system comprising a first winding for receiving a command signal to said system, a rotatable winding inductively coupled to said first winding to receive a signal therefrom, a servo energized by said signal in said rotatable winding, a control surface connected to move in response to the energization of said servo, a signal generating means for generating a signal in response to said movement of said control surface, an amplifier operated by the combined signals of said generating means and said rotatable winding, a motor energized by said amplifier and coupled to turn said rotatable winding to vary the signal energizing said servo until said generated signal and said signal in said rotatable winding are equal and a predetermined movement of said control surface is obtained for said command signal.

9. A control system comprising a multiplier for receiving a command signal, said multiplier having a movable part whereby the output of said multiplier may be varied, means for feeding the output of said multiplier to a device to be controlled, means for generating a signal in response to the output of said device to be controlled, an amplifier and a motor, means for operating said amplifier by said generated signal and the input signal to said device to be controlled, means for energizing said motor by said amplifier, said motor being connected to turn said movable part to vary said output of said multiplier until said input to said controlled device and said generated signal are equal.

10. A flight control system comprising a multiplier, means for feeding a command signal to said multiplier, means for feeding the output of said multiplier to a servo, said servo being connected to move a control surface, means for feeding the output of said multiplier to a divider, means in said divider for producing a signal in response to a movement of said control surface, and means for feeding the output of said divider to said multiplier until said divider output is zero.

11. A constant output control system for maintaining a constant output of a controlled device for a given manual input regardless of varying load conditions, the combination of a motor adapted to drive a load, a multiplier coupling an input signal to said motor, circuit means for feeding the output of said multiplier to a divider, circuit means for feeding the output of said motor to said divider, said divider including means for combining said multiplier and said motor output into a resultant output, and circuit means for feeding said resultant output to said multiplier, whereby when said resultant output of said divider is zero said output of said motor to the load is constant for said input signal.

12. In a flight control system for maintaining a constant aircraft maneuver for a given manual input signal regardless of the aircraft flight conditions, a servo adapted to move a control surface of an aircraft, a multiplier for connecting an input signal to said servo, means for connecting the output of said multiplier to a divider, means in said divider adapted to generate a signal proportional to a movement of the control surface, said divider including means for comparing said output of said multiplier with said generated signal for obtaining a resultant output, and means connecting said resultant output of said divider to said multiplier for varying said multiplier output, whereby when said resultant divider output is zero said servo will move the control surface so as to obtain a constant aircraft maneuver for said given input signal.

13. In a flight control system for maintaining a constant aircraft maneuver for a given manual input signal regardless of the aircraft flight conditions, a servo adapted to move a control surface of an aircraft, a multiplier adapted to receive an input signal, the output of said multiplier connected to energize said servo, said multiplier having a movable part whereby said output may be varied, means for connecting said output to a divider, first means in said divider adapted to generate a signal proportional to a movement of the control surface, said divider including second means for comparing said output of said multiplier with said generated signal for obtaining a resultant output, and means connecting said resultant output of said divider to said movable part of said multiplier to decrease said resultant output, whereby when said resultant output of said divider is zero said servo will be energized to move the control surface so as to obtain a constant aircraft maneuver for said given input signal.

14. In a flight control system for maintaining a constant aircraft maneuver for a given manual input signal regardless of the aircraft flight conditions, a servo adapted to move a control surface of an aircraft, a multiplier adapted to receive an input signal, the output of said multiplier connected to energize said servo, said multiplier having a movable part whereby said output may be varied, means for connecting said output to a divider, first means in said divider adapted to generate a signal proportional to a movement of the control surface, said divider including second means for comparing said output of said multiplier with said generated signal for obtaining a resultant output, movable means in said divider for varying said generated signal, and means connecting said resultant output of said divider to said movable part of said multiplier and said movable means of said divider to decrease said resultant output, whereby when said resultant output of said divider is zero said servo will be energized to move the control surface so as to obtain a constant aircraft maneuver for said given input signal.

15. A constant output control system for maintaining a constant output of a controlled device for a given input, the combination of a device to be controlled, a multiplier coupling a control signal to said device, means for feeding the input signal of said device to a divider, means for feeding a signal proportional to the output of said device to said divider in opposition to said input signal, said divider including means for combining said input signal and said proportional signal to provide a resultant signal and means for feeding said resultant signal to said multiplier whereby when said resultant signal of said divider is zero, the output of said controlled device is constant.

References Cited in the file of this patent

UNITED STATES PATENTS

| | | | |
|---|---|---|---|
| 2,188,834 | Fishel | Jan. 30, | 1940 |
| 2,384,380 | Isserstedt | Sept. 4, | 1945 |
| 2,425,733 | Gille et al. | Aug. 19, | 1947 |
| 2,432,036 | Noxon | Dec. 2, | 1947 |
| 2,450,907 | Newton et al. | Oct. 12, | 1948 |
| 2,487,793 | Esval et al. | Nov. 15, | 1949 |
| 2,511,846 | Halpert | June 20, | 1950 |
| 2,528,575 | Broadbent | Nov. 7, | 1950 |
| 2,582,305 | Young | Jan. 15, | 1952 |
| 2,589,834 | MacCallum | Mar. 18, | 1952 |
| 2,630,282 | Halpert | Mar. 3, | 1953 |
| 2,659,554 | Murphy | Nov. 17, | 1953 |
| 2,664,530 | Young | Dec. 29, | 1953 |
| 2,723,089 | Schuck et al. | Nov. 8, | 1955 |